US012774057B2

(12) United States Patent
Samokhin et al.

(10) Patent No.: US 12,774,057 B2
(45) Date of Patent: Oct. 27, 2026

(54) STERN PLUG TO BE INSERTED INTO A STERN PORTION OF AN INFLATABLE BOTTOM OF A WATER JET BOAT

(71) Applicant: Nautica Technologies Limited, Nassau (BS)

(72) Inventors: Valerii Samokhin, Zielona Gora (PL); Oleg Baianov, Zielona Gora (PL); Stanislav Zykov, Zielona Gora (PL); Stanislav Gukin, Novosibirsk (RU)

(73) Assignee: Nautica Technologies Limited, Nassau (BS)

(*) Notice: Subject to any disclaimer, the term of this patent is extended or adjusted under 35 U.S.C. 154(b) by 981 days.

(21) Appl. No.: 18/084,850

(22) Filed: Dec. 20, 2022

(65) Prior Publication Data

US 2023/0192238 A1 Jun. 22, 2023

Related U.S. Application Data

(60) Provisional application No. 63/291,867, filed on Dec. 20, 2021.

(51) Int. Cl.
*B63B 7/08* (2020.01)

(52) U.S. Cl.
CPC ................ *B63B 7/082* (2013.01); *B63B 7/08* (2013.01); *B63B 7/087* (2013.01); *B63B 2231/40* (2013.01); *C04B 2235/5244* (2013.01)

(58) Field of Classification Search
CPC ........... B63B 7/08; B63B 7/082; B63B 7/085; B63B 7/087
USPC .......................................................... 114/345
See application file for complete search history.

(56) References Cited

U.S. PATENT DOCUMENTS

| | | | | |
|---|---|---|---|---|
| 4,528,927 A | | 7/1985 | Iizuka et al. | |
| 4,892,054 A | * | 1/1990 | Davidson | B63B 5/24 114/355 |

FOREIGN PATENT DOCUMENTS

| | | | | | |
|---|---|---|---|---|---|
| CH | 616373 A5 | | 3/1980 | | |
| GB | 1350208 A | * | 4/1974 | B63B 7/082 | |
| RU | 145840 U1 | | 9/2014 | | |
| RU | 154960 U1 | | 9/2015 | | |
| RU | 177014 U1 | | 2/2018 | | |
| RU | 177430 U1 | * | 2/2018 | B63B 7/00 | |
| RU | 190761 U1 | * | 7/2019 | B63B 7/00 | |

(Continued)

*Primary Examiner* — Ajay Vasudeva
(74) *Attorney, Agent, or Firm* — MUNCY, GEISSLER, OLDS & LOWE, P.C.

(57) ABSTRACT

The invention relates to a small-sized shipbuilding. In particular, to a stern plug to be inserted into a stern portion of an inflatable bottom of a water jet boat, the plug is made such that it follows a shape of a front portion of the bottom of the boat, based on a hollow volume that is open at one base and comprises a closed second base and a lateral surface, the lateral surface is arranged along an outer contour of the closed base, and the closed base is made such that it follows a shape of the front portion of the bottom, and the lateral surface is made in a form of shelves, where an upper shelf is made straight, wherein the plug is made in a form of a monolithic cast piece of an elastic shape-retaining material, where the open base has a mesh cellular structure, where a lower shelf of the bottom is made straight, and plate-shaped guides for fixing to the boat are mounted on the shelves.

4 Claims, 4 Drawing Sheets

(56) References Cited

FOREIGN PATENT DOCUMENTS

| | | | | |
|---|---|---|---|---|
| RU | 208608 | U1 | | 12/2021 |
| RU | 2834118 | C1 | * | 2/2025 |

* cited by examiner

STERN PLUG TO BE INSERTED INTO A STERN PORTION OF AN INFLATABLE BOTTOM OF A WATER JET BOAT

BACKGROUND OF THE INVENTION

Filed of Invention

The invention relates to a small-sized shipbuilding, in particular, to appliances for inflatable water jet boats that may be used to provide a stable quality of a bottom geometry and to enhance driving characteristics of the inflatable water jet boats.

Description of the Background Art

It is known that one of critically important features of an inflatable motor boat is a longitudinal rigidity of a body that should be sufficient to take a motor weight and a propeller rest which are normally mounted on a rigid transom that is mounted in a stern portion between side chambers of the inflatable boat having a U- or A-shaped contour of the body. Increase of the longitudinal rigidity of the body facilitates enhancement of a seaworthiness, including the boat's output for planing, as well as increases a vessel's course stability.

The most known solution of this problem is to use floorboards in a structure of the bottom of inflatable boats, while the floorboards in this case provide not only a support under feet of passengers, but also are a constituent part of a rigid frame of the boat (see U.S. Pat. No. 4,528,927A, publ on.: 16.07.1985., RU154960U1, publ. on.: 20.09.2015., CH616373A5, publ. on.: 31.03.1980. RU145840U1, 27.09.2014).

Most frequently, the floorboards are made of plywood shields which take the propeller rest transmitted by the transom. Drawbacks of this type of solutions include an inconvenient practical application of the floorboards, an increase of a weight of the boat structure, a difficult transportation. Besides, use of the floorboards is usually excessive in structures of the inflatable boats having an inflatable bottom, so they almost are not used. Therewith, use of the inflatable bottom without floorboards does not provide the required longitudinal rigidity during its operation due to a high risk of a deformation of the bottom shape in the stern portion when mounting a motor on the transom, fixing the rigid transom to the bottom, and during influence made by water head and hitting in a front stern portion of the bottom and in a lower bottom portion of the inflatable bottom during operation of the boat.

Therewith, in order to enhance the seaworthiness and to soften hits in a certain extent during traveling on a wave, as well as to provide the boat's course stability, a deadrise is provided for the bottom, e.g., by placing a wooden keel between a fabric bottom and the floorboard, and the wooden keel provides a required tension of the fabric so as it could retain a given shape and resist against the water head and hitting. In the stern, the keel is usually rigidly fixed to the transom by means of a knee so that the keel could take a load together with the transom and the floorboard. Therewith, the transom is rigidly fixed to the floorboard by means of various knees, abutments and turnbuckles. However, in view of a significant increase of the boat's structure weight and its inappropriateness for using in collapsible structures, it is also impossible to use this solution in structures of inflatable boats having an inflatable bottom, which solve the problem of providing the bottom with the deadrise by using a tailoring of constituent elements of the inflatable bottom, e.g., by forming inflatable compartments having various volumes by using internal longitudinal partitions having various heights, thereby forming various profiles of the bottom: V-shaped, wave-shaped and any other shapes.

Prior art does not teach any solutions that could enhance the longitudinal rigidity of the structure of the inflatable boat by reinforcing the stern portion of the boat and increasing the stability of the bottom shaping in the process of its operation.

The closest analogue that partially solves this problem is a fixing insert of a stern portion of an inflatable bottom (RU177014U, published on.: Feb. 6, 2018) that is characterized by shaping a body of a box-like shape based on a hollow volume that is open at one base and comprises a closed second base and a lateral surface, the lateral surface is arranged along an outer contour of the closed base, wherein the closed base is made such that it follows a shape of a front portion of the bottom, and the lateral surface is made in a form of shelves, where an upper shelf that is adjacent to an upper surface of the bottom is made straight, and shelves along a lower side and a lateral side of the closed base are made such that they follow, in a conjugation area, a contour of a lower surface of the inflatable bottom and an external surface of chambers of inflatable sides respectively.

A technical problem of the prototype is the box-shaped structure that does not provide a sufficient rigidity of the insert in order to compensate for loads imparted to the bottom of the boat (a wave, a hit etc.) and a return to an initial geometry, since for the box-like structure, in case there is a pressure within the bottom, a front end of the insert will have "an inflated-rounded" shape that, in turn, will result in both alternation of an overall geometry and loss of a rigidity.

Besides, there are also certain problems when mounting the prototype's insert in the boat's stern, since the prototype implies pasting of the bottom "in tension" along a perimeter that does not allow to achieve a more accurate arrangement of the insert relative to the bottom and, thus, of the overall geometry.

SUMMARY OF THE INVENTION

The invention is aimed to solve said technical problems of the prototype, while preserving advantages which are provided by reinforcing the stern portion of the water jet boat.

A technical effect of the invention lies in providing a more rigid structure of the insert as compared to the prototype, which is able to retain an initial shape and to achieve a more accurate arrangement of the insert relative to the bottom and the overall geometry of the water jet boat.

Said technical effect is achieved by a claimed stern plug to be inserted into a stern portion of an inflatable bottom of a water jet boat, the plug is made such that it follows a shape of a front portion of the bottom of the boat, based on a hollow volume that is open at one base and comprises a closed second base and a lateral surface, the lateral surface is arranged along an outer contour of the closed base, and the closed base is made such that it follows a shape of the front portion of the bottom, and the lateral surface is made in a form of shelves, where an upper shelf is made straight, wherein the plug is made in a form of a monolithic cast piece of an elastic shape-retaining material, where the open base has a mesh cellular structure, where a lower shelf of the bottom is made straight, and plate-shaped guides for fixing to the boat are mounted on the shelves.

Preferably, the plug is made of a polyurethane.

It is conceivable that the plug is made of an ethylene vinyl acetate (EVA).

Preferably, the plate-shaped guides for fixing to the boat are mounted on the bottom and on an upper portion of the plug.

DETAILED DESCRIPTION

Figure 1:
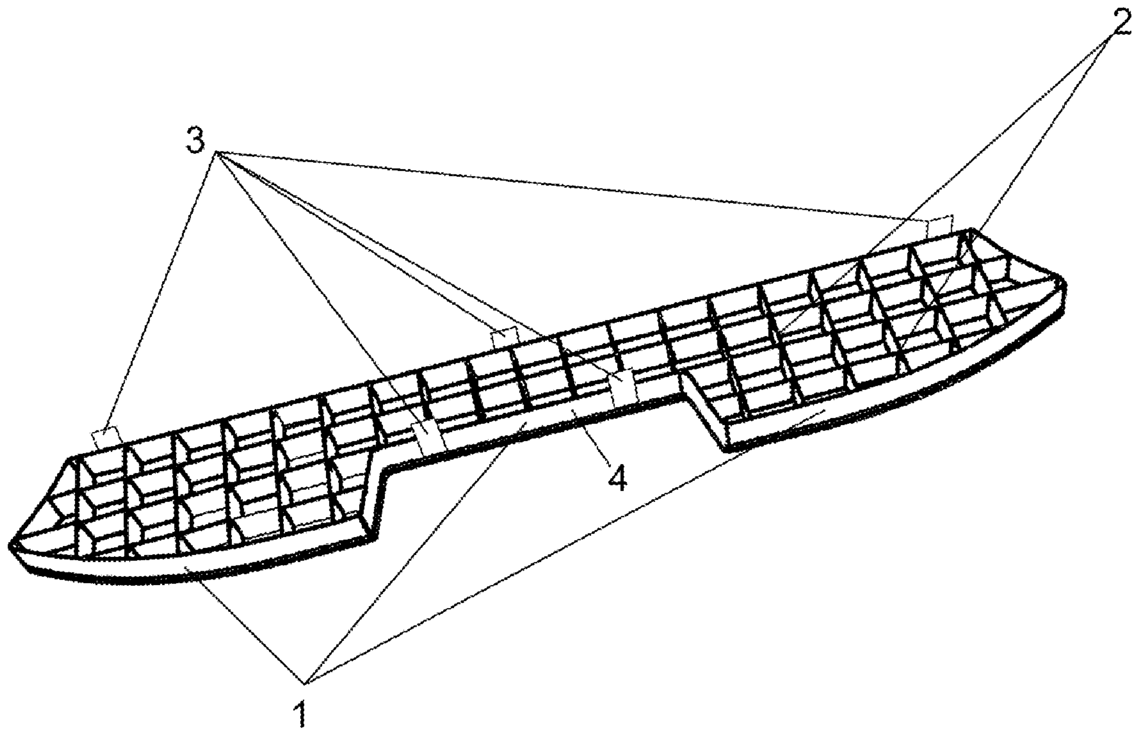
FIG. 1 illustrates an arrangement of the invention (an interior view as seen from an internal open side of the base).
Figure 2:
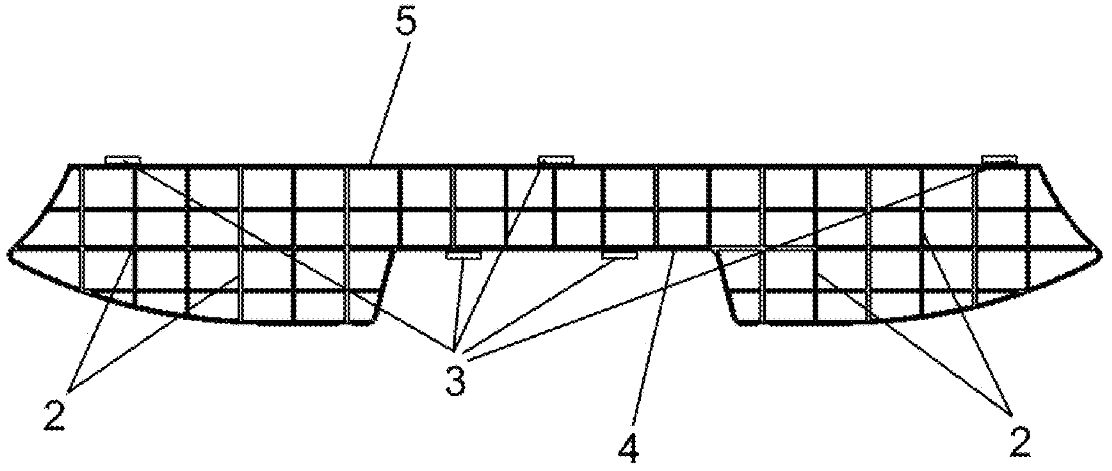
FIG. 2 illustrates an arrangement of the invention (a plane view as seen from the internal open side of the base).

A stern plug (see FIG. 1, FIG. 2) is to be inserted into a stern portion of an inflatable bottom of a water jet boat. It is made such that it follows a shape of a front portion of the bottom of the boat based on a hollow volume that is open at one base 7 and comprises a closed second base 9 and a lateral surface 1, the lateral surface is arranged along an outer contour of the closed base 9. The closed base 9 is made such that it follows a shape of the front portion of the bottom, and the lateral surface is made in a form of shelves, where an upper shelf 5 is made straight.

What is novel is that the plug is made in a form of a monolithic cast piece of an elastic shape-retaining material.

Figure 5:
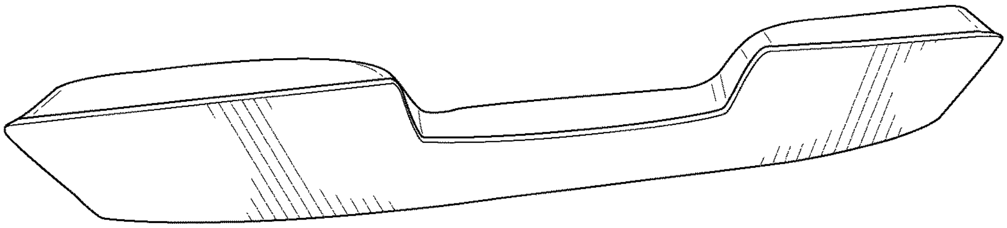
FIG. 5 illustrates an example of the manufactured plug according to the invention (with no guides mounted) as seen from the closed side of the base.

The open base 7 (see also FIG. 5) has a mesh cellular structure. Mesh cells may be formed by intersected parallel partitions 2.

A lower shelf of the bottom 4 is also made straight, and plate-shaped guides 3 for fixing to the boat are mounted on the shelves.

Preferably, a polyurethane is used as the elastic material. However, the plug also may be made of an ethylene vinyl acetate (EVA), if needed. The plug may be made of the EVA in order to provide it with insulating properties to reduce its thermal conductivity.

The plug is manufactured by a casting method in a one single piece, e.g., by molding or pouring.

During its use, it is pasted into the front part of the stern of the inflatable bottom of the water jet boat.

Figure 9:
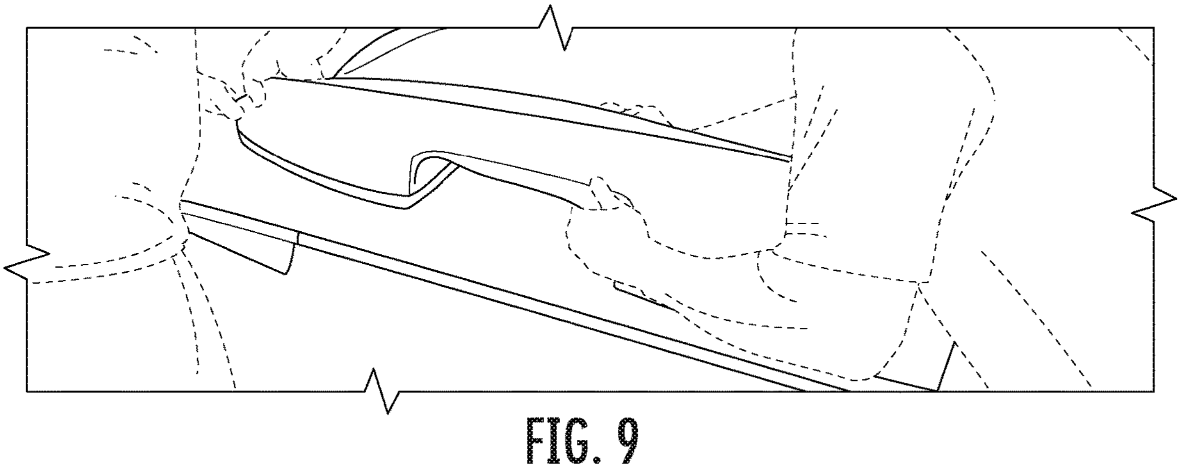
FIG. 9 illustrates an example of fixing the plug to the front portion of the boat stern.
Figure 10:
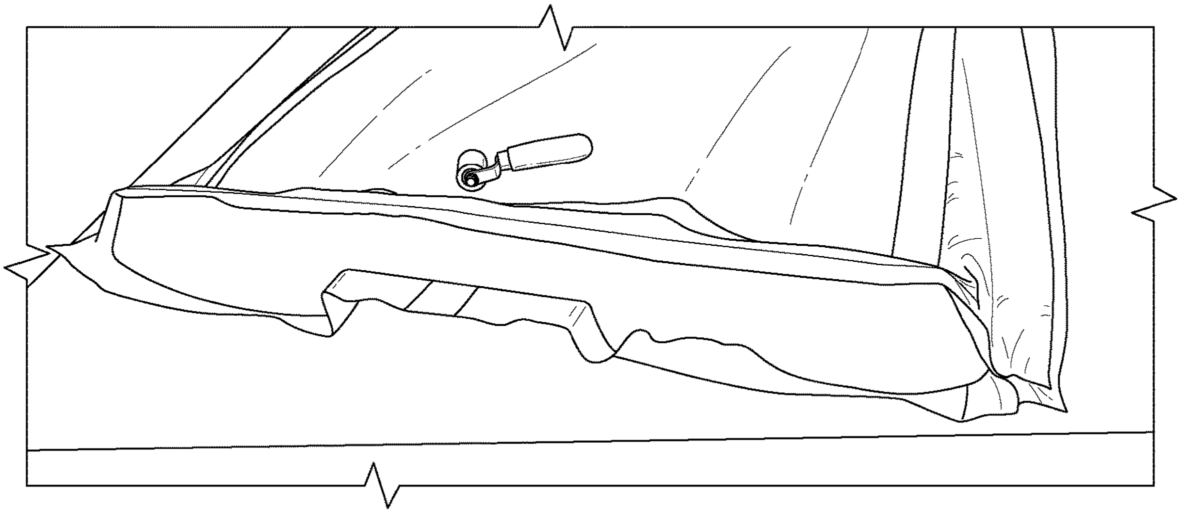
FIG. 10 illustrates an example of the plug that is already fixed to the front portion of the boat stern.

The plug pasting process is simple and illustrated in FIG. 9 and FIG. 10.

Figure 3:
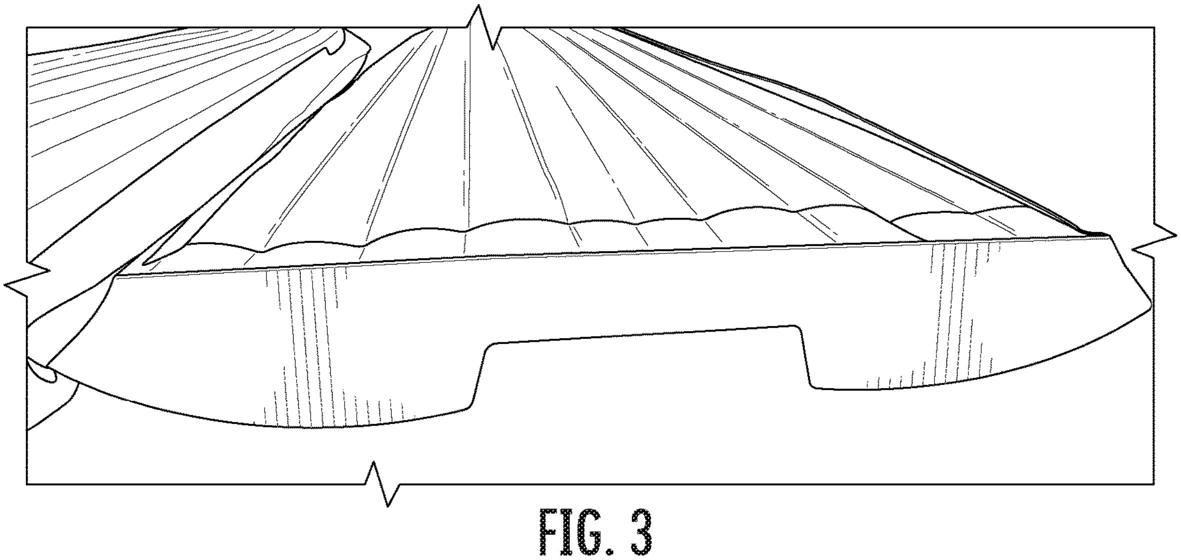
FIG. 3, FIG. 6, FIG. 7 illustrate an example of the boat with the mounted plug according to the invention.
Figure 6:
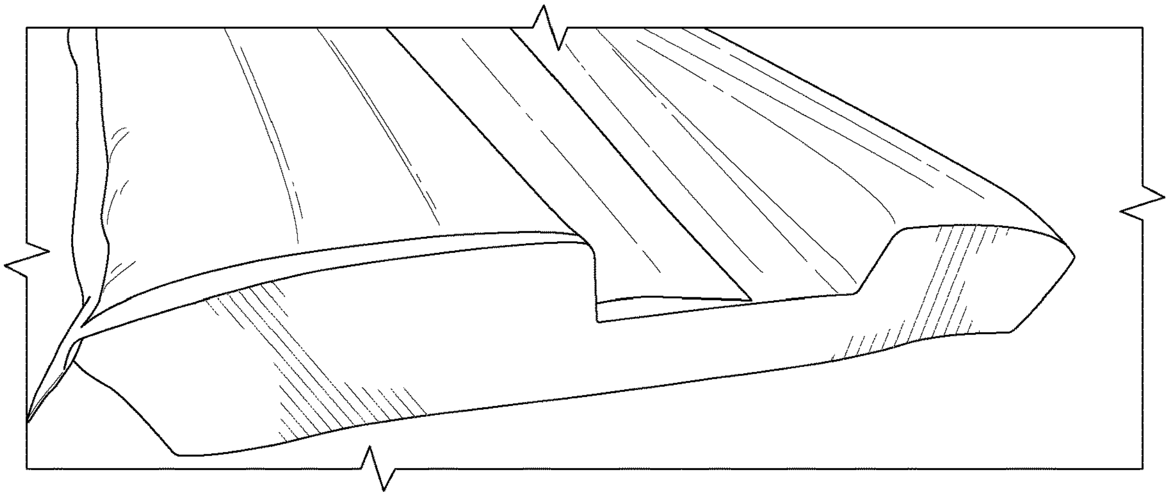

Upon glued to the boat, the plug provides a stable geometry of the bottom (see FIG. 3, FIG. 6, FIG. 7) which, in turn, improves the boat's driving performance.

In contrast to the prototype, the claimed solution has the monolithic mesh cellular structure made of the elastic material, rather than a box-shaped one.

This design of the plug provides a larger rigidity, while in case of loads acting onto the bottom (a wave, a hit etc.) it is able to compensate a created increased pressure in the bottom of the water jet boat and to provide a return to the initial geometry due to making from the elastic material and to the provision of the partitions 2 of the mesh cells.

In contrast to the prototype, no pasting of the bottom "in tension" along the perimeter is performed. The provision of the guiding plates 3 which are fixed on the side shelves allows to achieve a more accurate arrangement of the plug relative to the bottom and, thus, the overall geometry (see FIG. 6).

The plate-shaped guides 3 for fixing to the boat may be mounted, e.g., on the bottom 4 and on the upper shelf 5 of the plug. They also may be mounted in other locations of the side surface 1, if needed.

Figure 4:
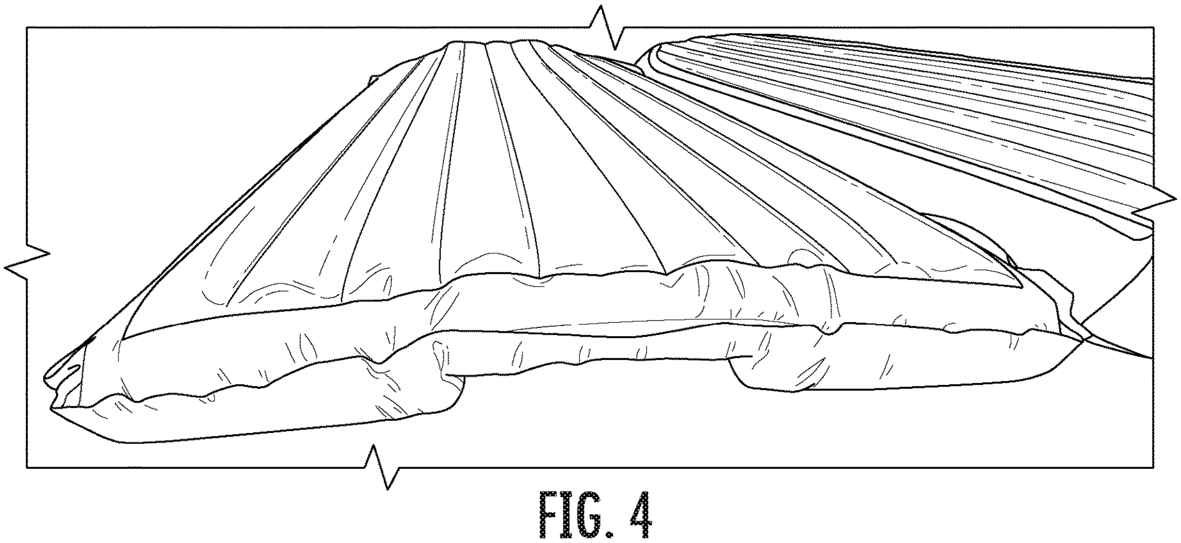
FIG. 4 and FIG. 8 illustrate an example of the boat with an overlapping gluing that is used when manufacturing PVC boats, in which a bottom is assembled from a stern by gluing pieces of a deck and the bottom itself by means of overlapping one piece onto another one.

For comparison, a variant of the boat (see FIG. 3) with the mounted plug according to the invention and a variant with an overlapping gluing (see FIG. 4) that is used when manufacturing PVC water jet boats, in which a bottom is assembled from a stern by gluing pieces of a deck and the bottom itself by means of overlapping one piece onto another one.

This plug forms the stern portion of the bottom of the water jet boat, in particular, its longitudinal geometry, more precisely as seen from the comparison between the variant according to the invention (see FIG. 7) and the variant with the overlapping gluing (see FIG. 8) that is used when manufacturing PVC boats, in which the bottom is assembled from the stern by gluing pieces of the deck and the bottom itself by means of overlapping one piece onto another one.

Figure 7:
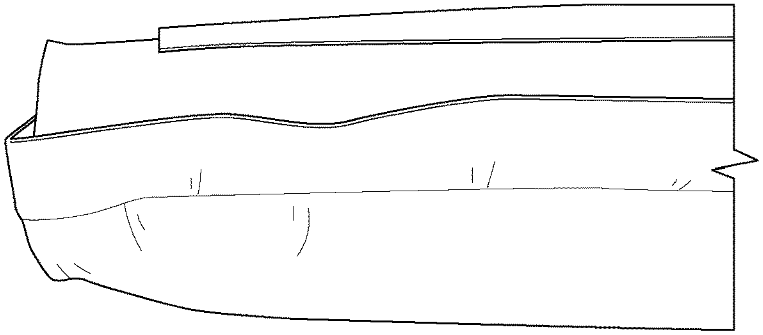
Figure 8:
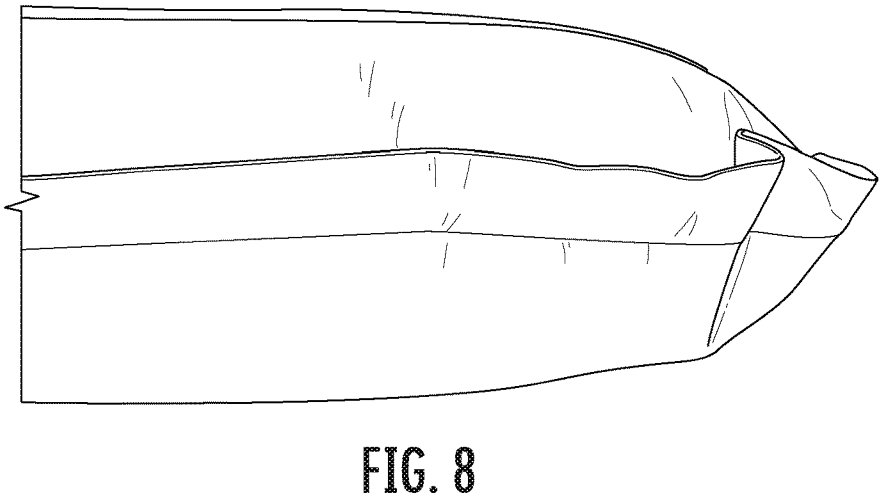

As seen from the comparison between FIG. 7 and FIG. 8, the overlapping gluing provides a rounded shape of the stern end (FIG. 8) (alteration of the bottom geometry) as compared to the variant according to the invention (FIG. 7), where the end is chopped. The chopped end of the stern results in improved driving performance of the water jet boat, since the bottom becomes smoother with no curvatures both in a longitudinal section and in forming a tunnel for a water jet nozzle.

The pasting of the plug according to the invention is performed as follows.

A glue is applied along the perimeter of the side surface 1 of the plug and on the stern portion of the pieces of the boat's bottom and deck. The glue is applied on the guides 3 as well.

Then, the plug is pressed to the stern portion of the water jet boat (see FIG. 9) and, by means of the guides 3, the plug 3 is arranged more accurately relative to the bottom of the boat, since the guides 3 which are arranged at least on the bottom 4 and on the upper shelf 5 provide a more rigid leaning of the stern bottom of the boat against the shelf of the bottom 4 of the plug as well as they are markers (reference points) of the stern of the water jet boat to which the plug should be glued by the guides 3.

Therefore, the claimed stern plug being supplemental to the transom allows to form a more stable water flow in a shallow water within a water jet tunnel in order to feed it to an intake of a water jet motor. Besides, the invention provides a stable geometry of the bottom when forming a water jet channel, thereby improving operational characteristics of the water jet boat.

What is claimed is:

1. A stern plug to be inserted into a stern portion of an inflatable bottom of a water jet boat, the plug is made such that it follows a shape of a front portion of the bottom of the boat, based on a hollow volume that is open at an open base defining an internal side of the plug, wherein the open base has a mesh cellular structure, and the plug further comprises a closed second base defining an external side of the plug and a lateral surface, the lateral surface is arranged along an outer contour of the closed second base, and the closed second base is made such that it follows a shape of the front portion of the bottom, and the lateral surface is made in a form of a plurality of shelves, wherein an upper shelf of the plurality of shelves is made straight, wherein the plug is made in a form of a monolithic cast piece of an elastic shape-retaining material wherein a lower shelf of the plurality of shelves configured at the inflatable bottom is made straight, and wherein plate-shaped guides for fixing to the boat are mounted on the shelves.

2. The plug according to claim 1, wherein the plug is made of a polyurethane.

3. The plug according to claim 1, wherein the plug is made of an ethylene vinyl acetate (EVA).

4. The plug according to claim 1, wherein the plate-shaped guides for fixing to the boat are mounted on a bottom of the plug and on an upper portion of the plug.

* * * * *